United States Patent

[11] 3,568,165

[72] Inventor John W. Kerr
Byron, Minn.
[21] Appl. No. 791,007
[22] Filed Jan. 14, 1969
[45] Patented Mar. 2, 1971
[73] Assignee International Business Machines Corporation
Armonk, N.Y.

[54] OVERRUN PROTECTION CIRCUIT FOR A COMPUTING APPARATUS
6 Claims, 1 Drawing Fig.

[52] U.S. Cl. .......... 340/172.5
[51] Int. Cl. .......... G05b 19/38
[50] Field of Search .......... 340/172.5; 235/157

[56] References Cited
UNITED STATES PATENTS

| | | | |
|---|---|---|---|
| 3,263,219 | 7/1966 | Brun et al. .......... | 340/172.5 |
| 3,283,308 | 11/1966 | Klein .......... | 340/172.5 |
| 3,370,276 | 2/1968 | Schell .......... | 340/172.5 |
| 3,399,384 | 8/1968 | Crockett .......... | 340/172.5 |

*Primary Examiner*—Paul J. Henon
*Assistant Examiner*—R.F. Chapuran
*Attorney*—Schroeder, Siegfried & Ryan

ABSTRACT: An overrun protection circuit for a computing apparatus having a plurality of I/O devices with predetermined load-operating characteristics operated in an overlap mode of operation. The overrun protection circuit includes a logic circuit at each I/O device and a test circuit at the CPU which provides a summation of load operating characteristics of all I/O devices operating in the computing apparatus at a predetermined instant and a comparison of such sum with a signal indicative of the maximum load-operating characteristic for the computer. The comparison signal determines whether the particular I/O device may be added to those operating in the computing apparatus at that instant and initiates operation in the logic circuit to accept or reject the operation request from the CPU.

PATENTED MAR 2 1971 3,568,165
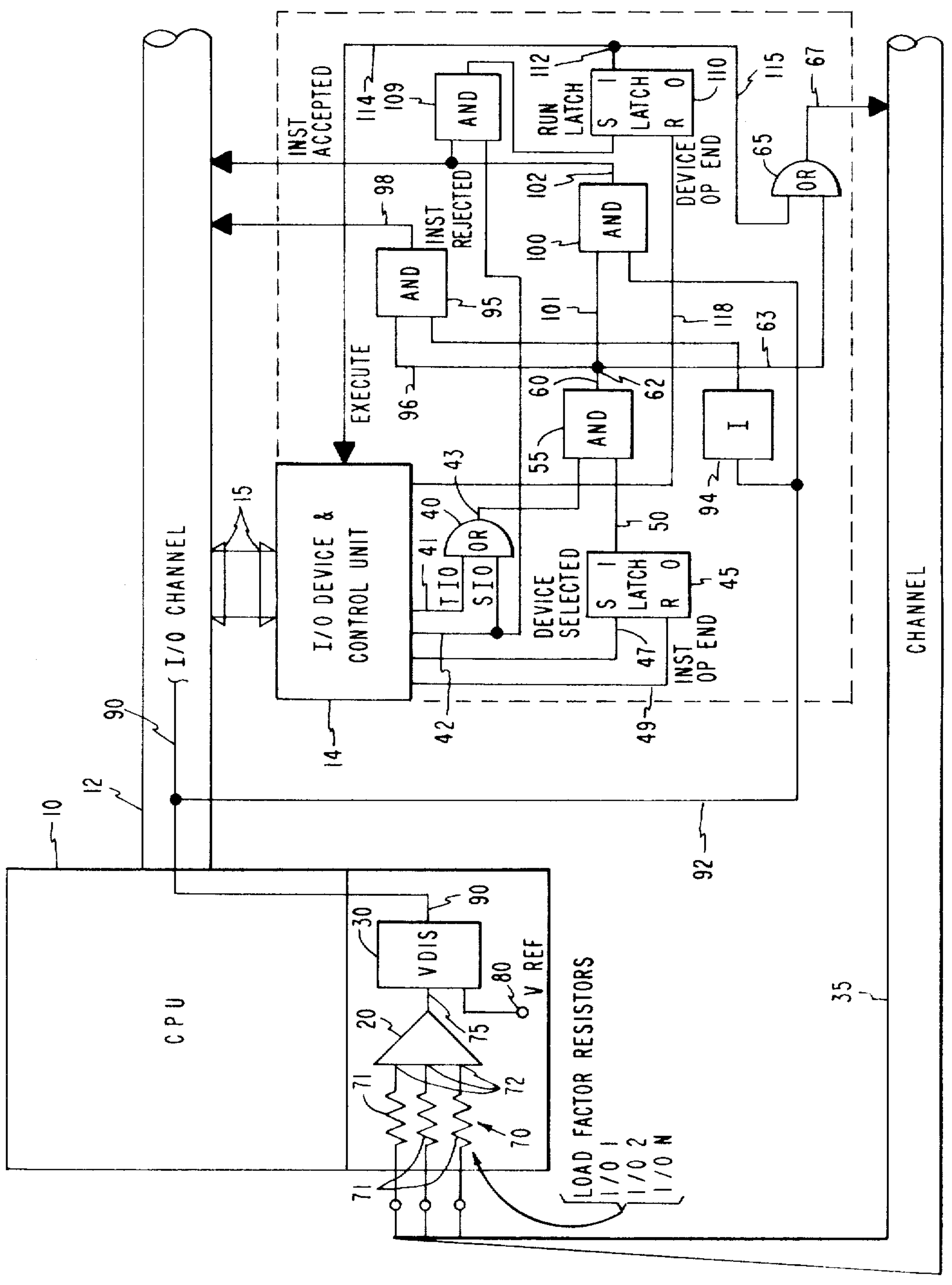
INVENTOR
JOHN W. KERR
BY Schroeder, Siegfried & Ryan
ATTORNEY

OVERRUN PROTECTION CIRCUIT FOR A COMPUTING APPARATUS

My invention relates to improvements in data processing systems and more particularly to an overrun protection circuit for computing apparatus where devices of the same are operating in an overlap or time-sharing mode of operation.

Present day data processing systems experience a condition known as overrun when the I/O burden due to numerous I/O devices operating simultaneously is such that their operation exceeds the critical value or capacity of the associated computing apparatus to handle such data transmission to and from the I/O devices which results in a loss of data. This type of operation occurs when the I/O devices are operated in an overlapping mode of operation due to programming. Current practices under such conditions are either to restart and rerun the program to determine whether the next attempt at running the program will not result in an overrun condition or to operate those I/O devices with the highest burden or load capacity consumption rates in a nonoverlap mode. In either case, such operation promotes inefficiency in computer operation. The capacity of data processing or computer apparatus to handle the transmission of data is largely determined by the number of exchange channels therein and upon the data transmission rates of the units involved or attached thereto. Thus, the computing or data processing apparatus may include a number of input-output devices or I/O devices which have different transmission rates or load factors depending upon the relative amount of exchange capacity which is necessary to service such units. Previously, the program was set up to avoid exceeding exchange capacity by keeping track of the amount of data flow in process at any one time through an indication of the units operating at that time. This was burdensome to a programmer, required additional use of main storage, required additional program execution time, and required interrupt after every I/O operation to enable the subtraction of the associated load factor.

In the present invention, an overrun protection circuit is provided which will permit overlapping of all I/O devices by keeping track of the current I/O burden due to all devices selected and in operation. With the overrun protection circuit, an additional logic unit is added to each I/O device and tied to a summing apparatus which will measure the current burden at any one time of all I/O devices operating. These will be compared against a maximum reference and when any additional devices are selected by the program through an instruction issued from the central processing unit (CPU) a determination will be made whether that I/O device selected may be added or made operative. This will be accomplished by selecting an I/O device through the program and performing a test to determine whether the resulting I/O burden might result in overrun. If the test shows that there is no danger of an overrun, then the device selected is made operative and the program will continue operation. If there is a possibility of overrun, the program remains at this instruction unless an interrupt at some time occurs, until the I/O burden reduces to such a value that the device can be selected and made operative. At this time, the program will continue. Of course, with this invention it would also be possible for the program to advance to another instruction to do another job such as processing data until the load factor changes to permit selection of the device.

The logic circuit or network at each I/O device permits selection by way of a start I/O or test I/O instruction which will initiate a circuit to add a load factor representative of the load factor or data transmission rate of the particular I/O device involved to a summing amplifier which will be maintaining a current summation of all I/O devices operating at that time. The change in load when compared against the 100 percent load factor of the computer, will determine whether the device selected may be added by way of operation to the computer at that time. The resolution signal will be fed back to the I/O device which will generate a signal determining whether the instruction from the CPU is to be rejected or accepted and an operation signal supplied in the latter case to the control circuit of the I/O device for operation with an additional locking circuit to maintain the load factor of the I/O device under these conditions in the summed group at the summing amplifier. With this improved computing apparatus or overrun protection circuit, the overrun condition should never occur and overrun detection circuits may be eliminated. Similarly, restart of programs or reruns due to loss of data will be eliminated and I/O devices need not be restricted to burst-type mode of operation. The overall resultant or useful capacity of the computer is increased and greater efficiency is obtained in the operation of the computer.

Therefore, it is the principal object of this invention to provide an improvement in data processing apparatus in the form of an overrun protection circuit.

Another object of this invention is to provide simplified logic circuit which may be added to each of the I/O devices of a computing apparatus and to its central processing unit to determine current load of I/O devices operating in a computing apparatus compared with the data transmission capacity of the computing apparatus for the purpose of preventing overrun in the same.

A still further object of this invention is to provide an improved overrun protection circuit of this type which will permit test of an instruction to an I/O device prior to its operation to prevent overrun in the event that data transmission capacity of a computing apparatus will be exceeded.

A still further object of this invention is to provide an improved overrun protection circuit which maintains a current indication of load factors of I/O devices presently in operation in a computing apparatus with provisions for removing devices whose operation has been terminated and adding new devices upon instructions from a CPU.

These and other objects of this invention will become apparent from a reading of the attached description, together with the drawing in which the overrun protection circuit is shown in a schematic logic diagram in conjunction with a portion of a computing apparatus.

My invention in an overrun protection circuit for computing apparatus is applicable to most types of data processing systems. As an example, the data processing system shown in the U.S. Pat. to G. M. Amdahl, et al., No. 3,400,371, dated Sept. 3, 1968 and entitled "Data Processing System" is an example of the IBM System/360-type computing apparatus with which it may be used.

In the drawing, the applicable components of such a data processing system are shown in block form for simplicity. Thus, in the drawing, the central processing unit or CPU is indicated by the numeral 10 which is connected to an I/O channel 12 leading to a plurality of I/O devices and associated control units, one of which is shown at 14 in block. These may take the form of card readers, card punches, printers, tape units, etc. with different load factors and requiring different exchange capacities necessary to service the unit. Such units receive control signals from and transfer data to the I/O channel through differing circuits, indicated in general by the double arrows schematically shown at 15 in the connection between the I/O channel and the I/O device. For simplicity, only a single I/O device is shown, but it will be recognized that for the overrun protection circuit all of the I/O devices in a data processing unit or computer will have a similar logic circuit forming the portion of the overrun protection circuit which would be connected to and control the summing amplifier, indicated generally at 20, and voltage discriminator, indicated generally at 30, as an addition in the central processing unit or CPU. These will be connected through a separate I/O channel, indicated generally at 35, from each of the respective devices to the CPU. The components of the logic network are all standard units, such as AND, OR and LATCH units and voltage discriminators. Similarly, the summation amplifier 20 is a conventional unit with a plurality of input signals. Circuits for such units may be found in the U.S.

Pat. to D. L. Malaby, No. 3,337,766, dated Aug. 22, 1967 and entitled "Selective Beam Positioning Of A Flying Spot Scanner With Error Correction." Similarly, the CPU, the I/O channel, and a variety of types of I/O devices are shown schematically and in circuit in the above-identified Amdahl et al. U.S. Pat. No. 3,400,731.

The logic network of the overrun protection circuit, which is included in each of the I/O devices, includes a first OR device, indicated generally at 40, having a pair of input circuits 41, 42 and an output circuit 43 evidenced by lead lines therefrom. As shown in the drawing, the input circuit 41 receives its signal from the control unit of the I/O device, indicated at block at 14, and is a test instruction for the I/O device input circuit. The circuit 42 is a start instruction for the I/O device and the output therefrom, as evidenced by the conductor 43, indicates a signal received on either one or the other of the input circuits. In addition to the instruction orders applied to the OR device 40, a LATCH 45 having a first input circuit 47 receives a signal from the I/O device control unit indicating that the particular I/O device is selected in accord with the program being serviced at the CPU. The second input conductor, indicated at 49, represents a reset signal which is received at the control unit of the I/O device and applied to the LATCH 45 whenever the instruction for said I/O device is completed. The output circuit from the LATCH, as indicated by the conductor 50, forms one input source for an AND device or unit 55 whose other input source is received from the OR device 40. Thus, whenever the particular I/O device has been selected, the LATCH will be operative to supply one input to the AND device 55 and the test I/O or start I/O signal will be applied to the OR device 40 producing the second input signal, the AND device, rendering the same operative at its output as evidenced by the conductor 60. The output conductor 60 of the AND device 55 is connected to a tie point 62 from which a first conductor 63 extends to an OR device 65. Whenever the AND device 55 is operative, indicating that the particular I/O device has been selected for operation by the program and has received an instruction signal, either start or test, an output will appear therefrom. The OR device 65 on receiving this output at one of its input conductors will produce an output signal at its output conductor 67 which will be fed to the channel 35 representative of a return channel from all I/O devices back to the CPU and the summing amplifier 20. The output conductor 67 will will be connected to one of a plurality of load factor resistors, indicated generally at 70, at one of the plurality of input terminals, indicated generally at 72, for the amplifier 20 whose output circuit 75 is connected to one of the input circuits of the voltage discriminator, indicated in block at 30. The output of the OR device 67 is a fixed voltage and each of the input circuits 72 has a unique load resistor 71 associated therewith which when energized by the fixed voltage will produce a current at the input proportional to the load factor of the particular associated I/O device. Thus, there will be an input circuit and a load resistor characterized for the load factor which the particular I/O device will place on the exchange of the computer when in operation. At the summing amplifier, a voltage input signal will occur at each of the inputs thereto associated with an operating I/O device in the computer at that instant. For each I/O device of the computer which is inoperative at that time, the OR unit 65 of the logic network for said I/O device will be inoperative and no voltage signal will be impressed on the input circuit to the summing amplifier with which the particular I/O device is associated. The summation of all these current signals will produce an output voltage at the output 75 of the summing amplifier proportional to the total load factor on the computer for all of the I/O devices operating at that instant. This voltage is fed to the discriminator 30 along with a fixed voltage reference, as indicated by the conductor 80, the latter being proportional to the total load factor or capability of the computer in the handling of data transmission. The reference voltage will represent a 100 percent load factor for the individual data processing system with which the overrun protection circuit is associated, and the voltage discriminator will produce an output which is of bilevel or of opposite polarity depending upon whether the sum of the total load factors is greater than or less than the reference voltage or the maximum load factor for the data processing unit. This output is fed through a conductor evidenced at 90 and directed through the CPU (Central Processing Unit) and I/O channel 12 to a conductor 92 leading to one input terminal of a pair of AND units 95, 100. The AND unit 95 receives its input from the conductor 92 through a phase inverter 94 and the second input terminal of each of the respective AND units 95, 100 is connected through conductors 96 and 101, respectively, to the reference or terminal point 62 leading to the output circuit 60 of the AND unit 55. Thus, depending upon the output of the comparator or voltage discriminator 30, one or the other of the AND units 95, 100 will be rendered operative by the comparison signal from the comparator to indicate whether the instruction from the CPU to the individual I/O device most recently added to the summing amplifier 20 will be accepted or rejected. The respective outputs of these AND devices, as indicated by conductors 98, 102, are fed back through the I/O channel as "instruction rejected" or "instruction accepted" signals to the CPU to determine whether the program will advance or remain at this instruction until such a time as the selected individual I/O device may be added or rendered operative to perform its function. As indicated in the drawing, the output signal 98 from the AND unit 95 is a rejected signal while the output signal from the AND unit 100 on conductor 102 is an accepted signal. The latter is connected to the input of AND unit 109 which also has an input from conductor 42. The output of AND unit 109 is connected to the set input of latch 110 whose output 112 is connected through a conductor 114 back to the control unit of the I/O device to initiate operation of the particular I/O device. This same output signal is connected through the conductor 115 to the OR device 65 which will render the OR device continuously operative and producing an output which will maintain the input voltage on the summing amplifier indicating that the particular I/O device is in operation and adds to the load or burden on the exchange for the computer. The reset terminal of the LATCH 110 is connected through a conductor 118 to the control unit of the I/O device where it receives a signal indicating that the operation of the particular I/O device is terminated for the purpose of resetting the LATCH and terminating the output to the OR device 65 so that the load factor voltage to the summing amplifier may be terminated with te:mination of the operation of the I/O device.

While I have shown the comparator as receiving its input from a summing amplifier, it is possible that a binary counter may be employed for this purpose to maintain or keep a current I/O burden of all I/O devices operative at one time. It will be obvious that other arrangements may be employed for this purpose.

In operation, an instruction, such as an SIO instruction, encountered during a program processing at the CPU will cause a specified I/O device to become selected through signals supplied from the I/O channel 12. The device selected LATCH 45 is turned on and this LATCH is Anded to the SIO instruction tag line from the OR device 40 on a test instruction input. The AND device 55 will become operative causing the OR circuit 65 to condition a load factor resistor 71 at the input 72 of amplifier 20 for the particular I/O device. This causes a test to be performed to determine if execution of this operation on the I/O device would result in an overrun situation. The load factor for each device is included in the load factor resistor network 70 in the Central Processing Unit and it causes a current proportional to the load factor to flow through the operational amplifier or summing amplifier 20. The output of this amplifier is compared through the voltage discriminator 30 with the reference voltage 80, the latter representing 100 percent load factor for the Data Processing Unit or Computer. If the sum of the load factors for the I/O devices then operating plus the load factor for the device selected exceeds the reference voltage, the output of the voltage discriminator will switch to a voltage output level representing overrun. This signal fed back through the I/O channel 12 will be applied to the AND units 95 and 100. The polarity of the overrun signal will be such that when inverted by the inverter 94 will provide an AND or input signal to the AND unit 95 causing the same to become operative and produce the instruction rejected signal at the output 98 which is fed back through the control channel 12 to the CPU 10. This type of signal output in the I/O channel represents a code 1 condition as set forth in the U.S. Pat. No. 3,400,371 (see Column 104, line 66). If the load factor on the summing amplifier does not exceed the reference voltage or 100 percent load factor on the exchanges for the Data Processing Unit, the instruction accepted signal will condition the AND unit 100 and the inversion of this signal applied to the AND unit 95 will render it inoperative. Thus, the output signal representing instruction accepted will appear at the output terminal 102 where it will be fed back through the I/O channel 12 to the CPU 10 and at the same time energize via AND 109 the LATCH 110 whose output will provide the execute signal to the control unit at the I/O device through the conductor 114. In addition, the output of the LATCH will also maintain energization of the OR device 65 through the conductor 115 to maintain the load factor signal on the summing amplifier indicating that this I/O device has been added to the burden on the I/O channel. Thus, the run LATCH causes the load factor for the particular device to be gated into the summing amplifier until the device operation is ended. The "instruction rejected" and "instruction accepted" signals from the lines 98 and 102 which pass back to the CPU via the I/O channel are sampled by the CPU at a proper time to determine whether to proceed to the next sequential instruction. The clock sampling for the logic system is in the CPU for these two signals and must be such as to allow the propagation of the test through the logic network and summing amplifier and out to the adapter and back to the CPU. The instruction accepted signal represents a condition code 0 as set forth in the U.S. Pat. No. 3,400,371 (see Column 104, line 66, etc.).

The improved overrun protection circuit for data processing unit includes new components which are added to each of the I/O devices such as AND units 55, 95, and 100, OR units 40 and 65, LATCH units 45 and 110 and inverter 94. In addition, the new control lines or channel lines, such as is indicated at 35 and conductor 92, will be included for each of the respective I/O devices. In the CPU, the summing amplifier with the load factor resistors 70 and the voltage discriminator 30 will provide the output to all of the I/O devices through the additional channel 92 representing all units.

The same concept for the overrun protection could also be used for interrupt load factors as well as cycle steal load factors in computing apparatus as set forth in the U.S. No. 3,400,371. Also, to enable variance in processing capacity with respect to cycle time allotted to I/O devices, the central processing unit could have a load factor resistor feeding into the summing amplifier or a plurality of reference voltages could be provided together with means for selecting the desired reference voltage.

I claim:

1. An overrun protection circuit for a computing apparatus having a plurality of I/O devices with predetermined load capacity operating characteristics and a CPU connected to the I/O devices through a control channel for controlling the same comprising, control apparatus for each I/O device including means indicative that said I/O device has been selected for operation, said indicative means being a latch unit having a first signal input producing a predetermined output in response to a selection signal and a second signal input indicative of the completion of the operation of the I/O device which produces an absence of the output signal from the latch unit, means responsive to an operation instruction for said I/O device from the CPU, said means responsive to the instruction operation for said I/O device being an OR unit having a pair of inputs responsive to a test signal for operation of the I/O device or the start signal responsive to a start command for the I/O device, means connected to and responsive to the selection indicating means and the instruction operation means to provide an output signal indicative of the need for operation of said I/O device, said means responsive to the selection indication and instruction operation means being an AND unit, combining means including a summing amplifier having a plurality of input circuits each representative of the load capacity operating characteristics of the respective I/O device of the plurality of I/O devices and an output indicative of the total load capacity operating characteristics of the I/O devices in the computing apparatus which are in operation, means responsive to the means indicative of the need for operation of the respective I/O device to activate one of said plurality of input circuits of the combining means, said means responsive to the means indicative of the need of operation of the respective I/O device being an OR unit having a plurality of inputs and a fixed voltage signal output, comparator means including a reference load capacity characteristic signal indicative of the maximum load capacity of the computing apparatus connected to the combining means and responsive to its output to produce a signal indicative of the comparison of the output signal of the combining means and the reference signal, and command signal means connected to the means providing a signal indicative of the need for operation of the I/O device and the comparator means and providing selectively signals to the CPU to control a condition of operation of the respective I/O device in accord with the comparison output signal.

2. The overrun protection circuit for a computing apparatus of claim 1 in which the comparator means is a voltage discriminator which compares the voltage due to the summation of all currents proportional to the total load capacity operating characteristic of all I/O devices operating at one time in the computing apparatus with a reference voltage representing 100 percent load for the computing apparatus and produces an output signal indicative of the relative magnitude of the summation of all of the load capacity operating characteristics of the I/O devices operating compared to the total permissive load capacity operating characteristics of I/O devices for the computer apparatus to be operating at a single period of time.

3. The overrun protection circuit for a computing apparatus of claim 2 in which the command signal means are a pair of AND units each connected to the responsive means providing the output signal indicative of the need for operation of said I/O device and the output of the comparator means to selectively indicate a signal to be fed back to the CPU indicative of the permissive condition of operation of said I/O device.

4. The overrun protection circuit for a computing apparatus of claim 3 and including a LATCH means connected to one of the AND units indicative of the condition that the instruction is accepted with the output of the LATCH unit being connected to the means activating one of the plurality of input circuits of the combining means to maintain said circuit activated during run operation of the said I/O device.

5. The overrun protection circuit for a computing apparatus of claim 4 and including additional circuit means connected to the LATCH means and the LATCH unit defining the means indicative that said I/O device has been selected for operation which additional circuits provide a reset signal for the LATCH units at completion of operation of the I/O device.

6. The overrun protection circuit for a computing apparatus of claim 5 in which the summation amplifier is of the analogue type and the comparator means is a voltage discriminator having a bilevel signal output.